March 14, 1967　　I. JEPSON ETAL　　3,308,566
PRESSING IRON
Filed March 21, 1963　　6 Sheets-Sheet 1

INVENTORS.
IVAR JEPSON
BY VELLO LAAMA

George R. Clark
ATTORNEY

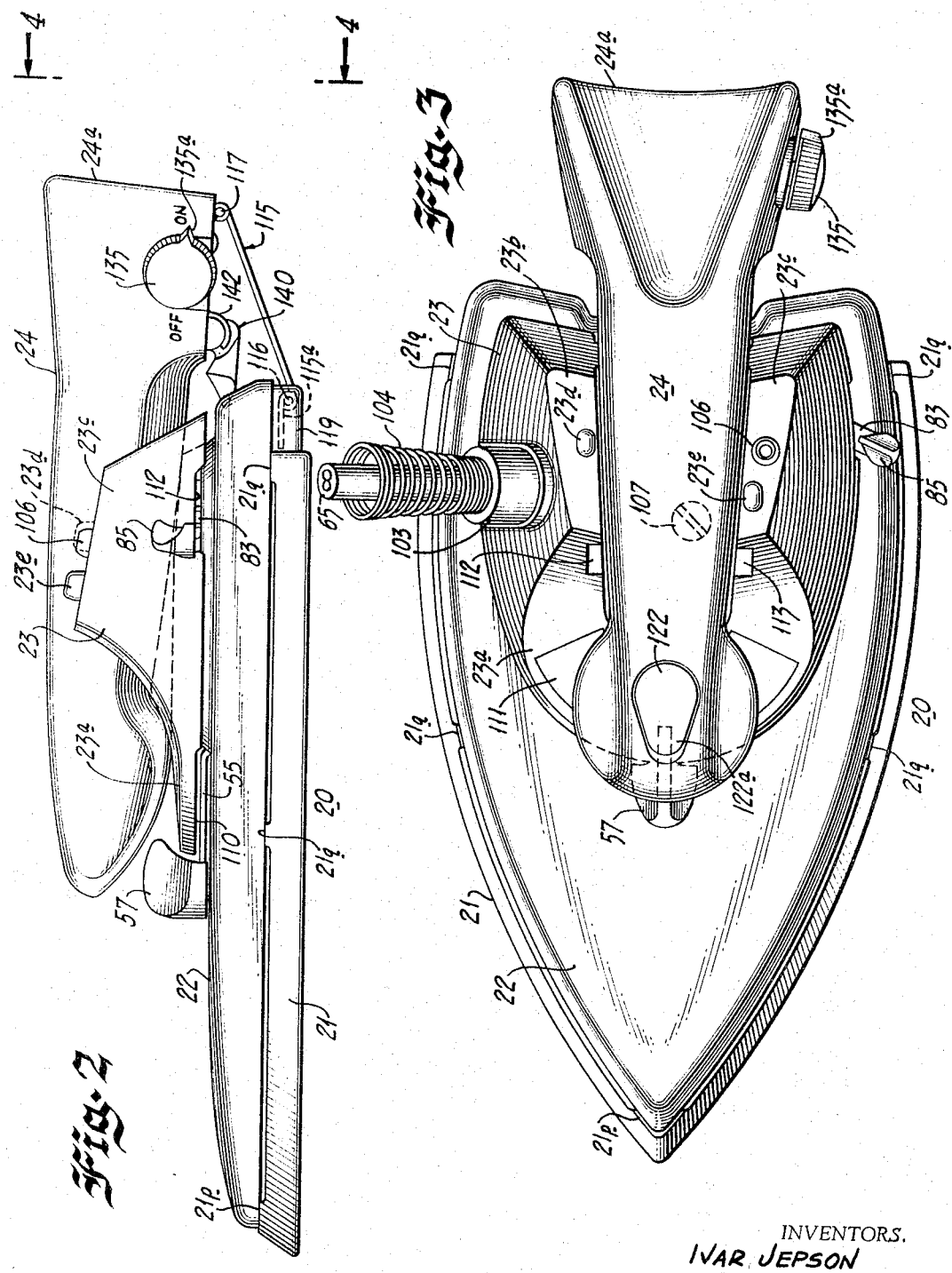

March 14, 1967 — I. JEPSON ET AL — 3,308,566
PRESSING IRON
Filed March 21, 1963 — 6 Sheets-Sheet 3

INVENTORS.
IVAR JEPSON
VELLO LAAMA
BY George R. Clark.
ATTORNEY.

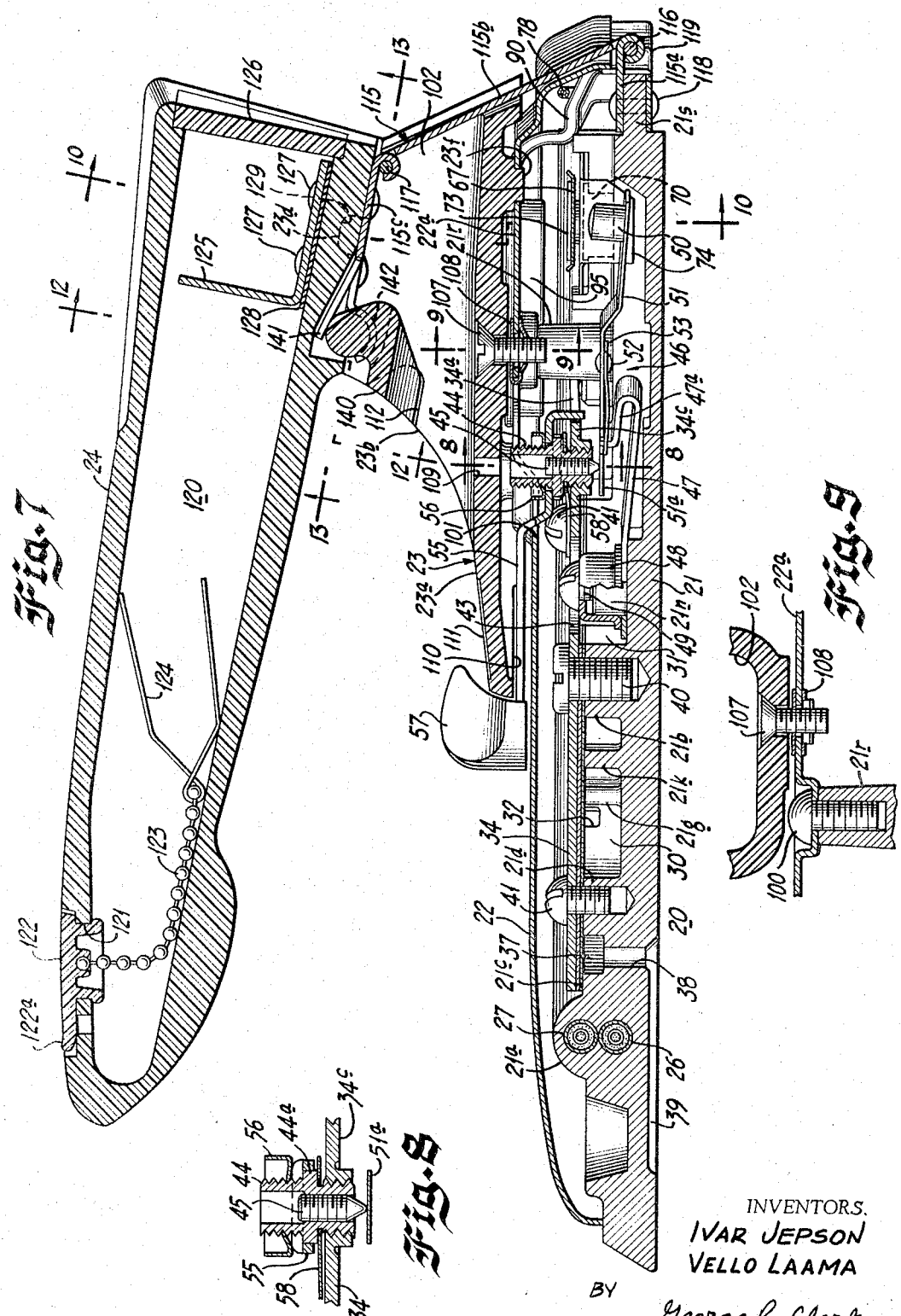

March 14, 1967   I. JEPSON ETAL   3,308,566
PRESSING IRON
Filed March 21, 1963   6 Sheets-Sheet 5
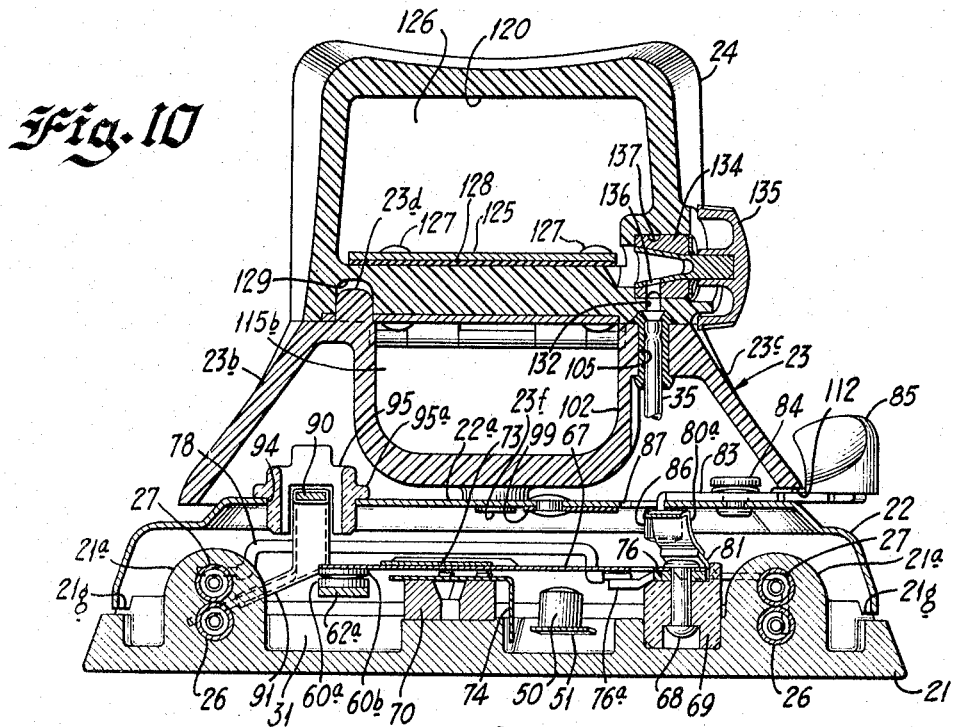
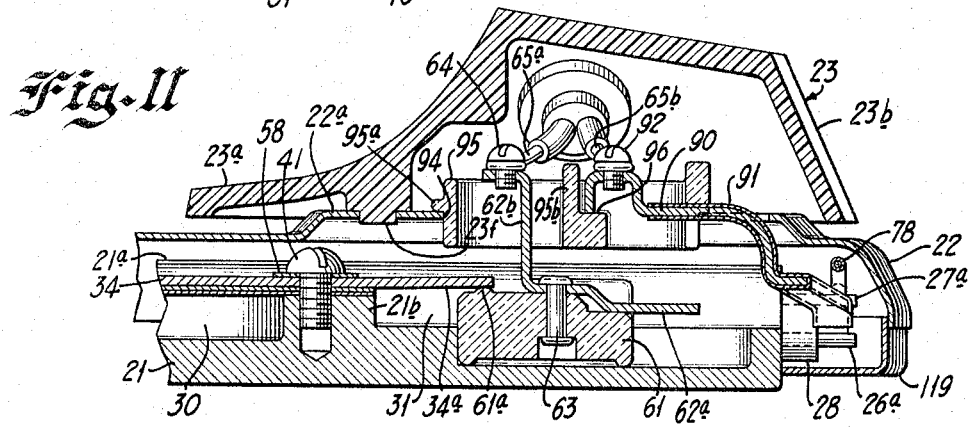
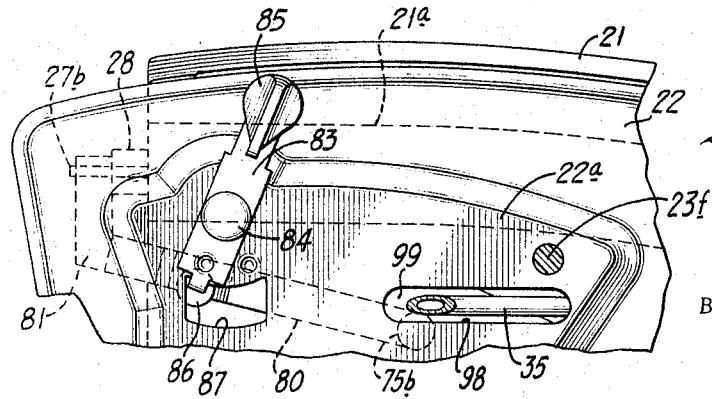
INVENTORS.
IVAR JEPSON
BY VELLO LAAMA
George R. Clark
ATTORNEY March 14, 1967     I. JEPSON ETAL     3,308,566
PRESSING IRON
Filed March 21, 1963     6 Sheets-Sheet 6
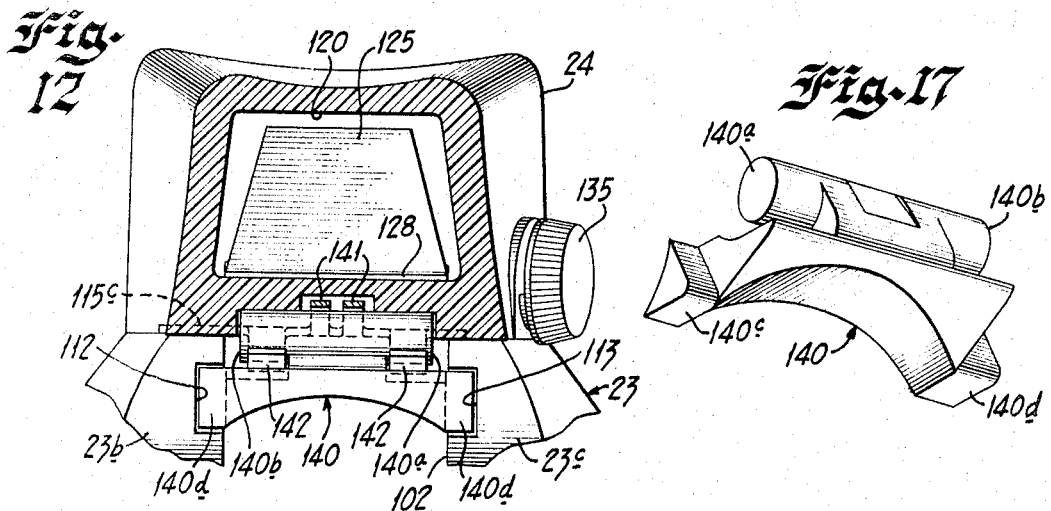
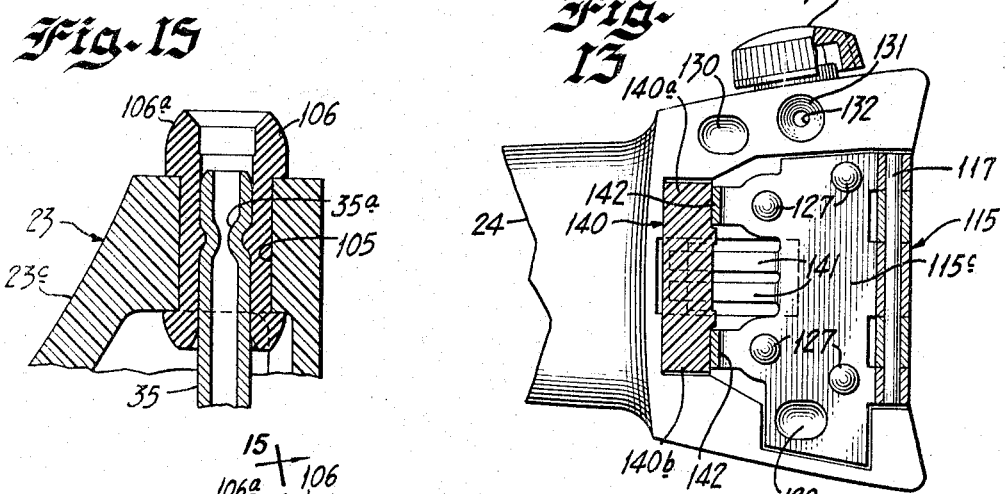
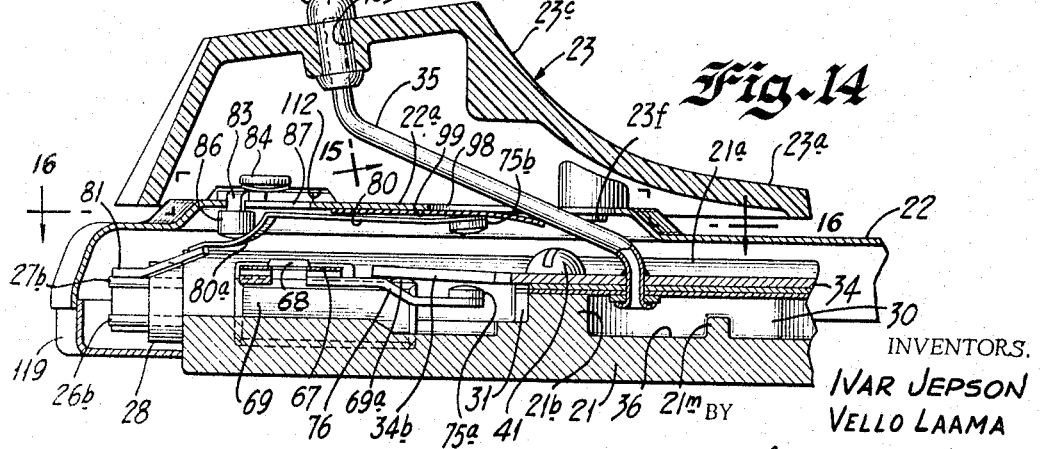
INVENTORS.
IVAR JEPSON
VELLO LAAMA
BY George R. Clark
ATTORNEY

United States Patent Office 3,308,566
Patented Mar. 14, 1967

3,308,566
PRESSING IRON
Ivar Jepson, Oak Park, and Vello Laama, Lombard, Ill., assignors to Sunbeam Corporation, Chicago, Ill., a corporation of Illinois
Filed Mar. 21, 1963, Ser. No. 267,014
24 Claims. (Cl. 38—77)

The present invention relates to pressing irons and more particularly to pressing irons which can be used either as a steam iron or as a dry iron. More particularly, the present invention relates to so-called "travel" irons which are very compact in size and are capable of being folded even to a more compact size so as to take up a minimum of space in a traveller's luggage.

The population of the United States has become very travel minded with the modern automobile and the modern highways that are available and millions of people are now travelling all over this country. Furthermore, with the advent of the jet airplane, it is commonplace for people to travel all over the world. With the modern fabrics, the steam iron has become almost a necessity and for a travelling public it would be desirable to have a so-called travel steam iron. In view of the fact that the standard electric power supplies in various countries of the world vary widely in voltage as well as frequency, an electric travel iron should be capable of operating equally well on voltages from one hundred twenty to two hundred and thirty, and on various frequencies of alternating current as well as on direct current. It would be desirable to provide a travel iron which would operate satisfactorily under the above-mentioned conditions.

Travel irons should be small and compact and when packed for travelling should be capable being arranged so as to have a minmium size. Moreover, the means for accomplishing this should be simple and foolproof in operation. Also to make a compact steam iron it is desirable for the water reservoir to be embodied within the handle, and the handle, of course, must be movable when the iron is arranged in its compact or travelling position. It would be desirable for such iron to have a detachable fluid connection between the water reservoir in the handle and the steam generator in the sole plate of the iron which is automatically completed when the handle is moved to its operative or ironing position and latched in such position. Such a travel iron should also have control means for closing the water outlet when the detachable fluid connection is broken so that the water will not drain from the reservoir. When the iron is in operative position it is preferable that the water control be by a suitable constriction in the water conduit rather than by valve means.

It is, of course, also essential that a travel iron be provided with temperature responsive control means for accurately maintaining the temperature of the sole plate. Moreover, in a travel iron which may be used on various voltages or on direct current as well as alternating current, improved control means for accomplishing the above are desirable. Furthermore, since the flash-type steam iron is generally considered superior to any other type of steam iron, it would be desirable for such a travel steam iron to have a flash-type generator which is capable of converting almost instantly water supplied thereto to a steam of the desired dryness for performing a proper ironing operation. The iron should have simple means for adjusting the same to operate on various voltages and also simple means for controlling the selected temperature thereof.

Accordingly, it is an object of the present invention to provide a new and improved steam or dry iron having the desirable features enumerated above.

It is another object of the present invention to provide a new and improved travel iron with improved means for reducing the same to a minimum size when arranged in the condition for travelling.

It is another object of the present invention to provide an improved travel iron which can be selectively used on different voltages and alternating current as well as direct current with uniform temperature control being maintained regardless of the source of electric power supplied thereto.

Still another object of the present invention is to provide an improved steam iron which embodies a pivoted handle which is simple and compact in structure, convenient to use, and capable of being manufactured at a low cost.

It is a further object of the present invention to provide an improved travel steam iron which is very compact and which includes temperature responsive control means for selectively controlling the temperature of the iron in any desired manner.

Still another object of the present invention is to provide an improved temperature responsive control means embodying a single bimetallic element so designed as to be self-compensating, and which can be used in a compact space for insuring proper temperature control.

Further objects and advantages of the present invention will become apparent as the following description proceeds and the features of novelty which characterize the invention will be pointed out with particularity in the claims annexed to and forming a part of this specification.

For a better understonding of the present invention reference may be had to the accompanying drawings wherein:

FIG. 2 is a side elevational view similar to FIG. 1 but showing the travel type iron arranged in condition for travelling;

FIG. 3 is a top plan view of FIG. 2;

FIG. 7 is a longitudinal sectional view with certain portions broken away of the pressing iron of the present invention taken on line 7—7 of FIG. 6 assuming that FIG. 6 shows the complete structure with the iron in the operating position of FIG. 1;

FIG. 8 is an enlarged fragmentary sectional view taken on line 8—8 of FIG. 7 also assuming that FIG. 7 shows the complete structure;

FIG. 9 is a fragmentary sectional view taken substantially on line 9—9 of FIG. 7, again assuming that FIG. 7 shows the complete structure;

FIG. 10 is a sectional view taken on line 10—10 of FIG. 7 also assuming that FIG. 7 shows the complete structure;

FIG. 11 is a fragmentary sectional view taken on line 11—11 of FIG. 6, also assuming that FIG. 6 shows the complete structure;

FIG. 12 is a fragmentary sectional view taken on line 12—12 of FIG. 7, again assuming that FIG. 7 shows the complete structure;

FIG. 13 is a fragmentary sectional view taken on line 13—13 of FIG. 7 again assuming that FIG. 7 shows the complete structure;

FIG. 14 is a fragmentary sectional view taken on line 14—14 of FIG. 6, also assuming that FIG. 6 shows the complete structure;

FIG. 15 is an enlarged sectional view taken on line 15—15 of FIG. 14, assuming that FIG. 14 shows the complete structure;

FIG. 16 is a fragmentary sectional view taken on line 16—16 of FIG. 14 assuming that FIG. 14 shows the complete structure; and FIG. 17 is a perspective view of a latch member of the pressing iron of the present invention.

Figure 1:
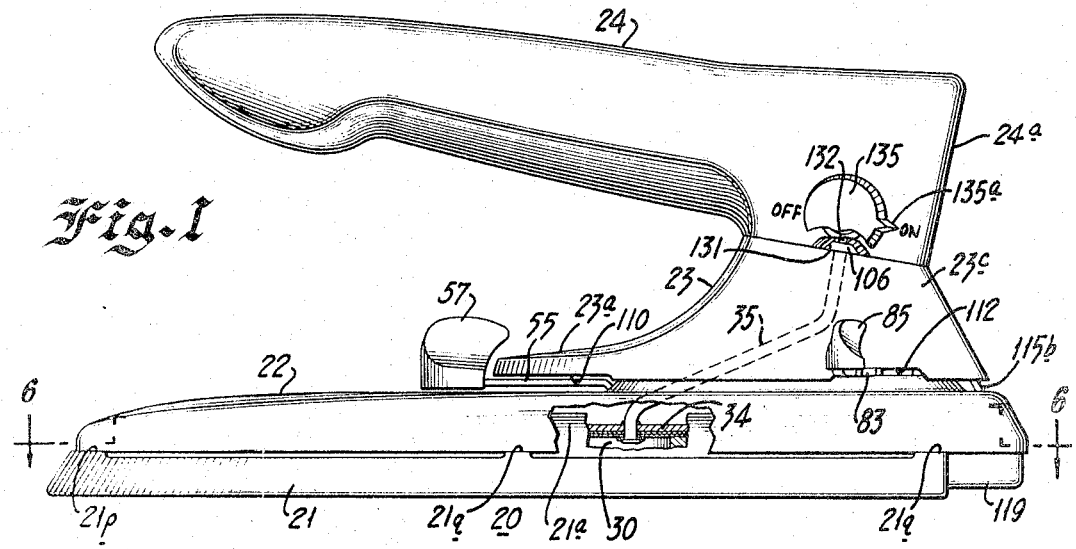
FIG. 1 is a side elevational view of a steam iron of the travel type embodying the present invention shown in the condition it assumes during an ironing operation with the voltage setting adjusted for high voltage, but with certain portions thereof broken away more clearly to illustrate the present invention.

Briefly, the present invention comprises a small flash-type travel steam iron having the reservoir located within the plastic handle. The handle is movably mounted with respect to the sole plate and connected thereto by means of a flat multipivot hinge member. This hinge member permits the handle to be displaced rearwardly and downwardly thereby reducing the height of the iron for more compact storage. The flash-type steam generator is located in the sole plate and in good heat transfer relationship with a plurality of heating elements embedded in the sole plate. A conduit between the reservoir and the flash-steam generating chamber of the iron has a simple detachable connection so that the reservoir and the movably mounted handle may be automatically connected thereto in a fluidtight manner when the handle is latched in its operating position. A manually operated valve means is provided so that the water outlet may be closed to permit operation as a dry iron and also to prevent the water contained in the reservoir from draining out when the connection is broken by moving the handle to its storage position. The flash-type steam generating chamber is provided with a suitable removable cover which is provided with rearwardly extending lugs to retain certain switch supporting parts in position and also to support adjustable means for controlling the temperature at which the iron operates by virtue of certain temperature responsive control means disposed in a chamber defined at the rear portion of the sole plate. An improved bimetallic temperature responsive member including a portion folded back upon itself provides a self-compensating bimetallic element and can be employed in a very compact space. Two separate sheathed heating elements are embedded in the sole plate one above the other and when the iron is operated on voltages standard in this country only one element is employed whereas when it is embodied on higher voltages, such as those in vogue in many foreign countries, then both elements are connected in series and a simple switch means is employed to adjust the iron for proper operation at the various voltages.

Referring now to the drawings, there is illustrated the travel steam iron of the present invention generally designated by the reference numeral 20. This iron is illustrated as comprising a sole plate 21, a cover shell 22, a handle support member 23, and a movable handle and reservoir member 24. The sole plate 21 is preferably constructed of a lightweight cast metal such as aluminum or the like and is substantially smaller than the sole plate of conventional pressing irons or steam irons. In an embodiment built in accordance with the present invention, the overall length of the sole plate was less than seven inches. The sole plate 21 is heated in a conventional manner by suitable electric heating elements, but in accordance with the present invention two separate sheathed heating elements 26 and 27 are provided (FIGS. 5, 6, 7 and 10 of the drawings). Sheathed heating elements are well known and generally comprise a helical resistance conductor centrally disposed within an outer metal sheath and supported in spaced relationship with respect to such sheath by an electrical insulating material which is also a good heat conductor. Such insulating material may comprise highly compressed magnesium oxide. Each of the sheathed heating elements 26 and 27 is preferably of a generally U-shaped configuration (FIG. 5) or in other words, each is in the shape of a hairpin. Also, as is best shown in FIGS. 6, 7 and 10 of the drawings, the sole plate 21 is provided with a raised integral U-shaped rib 21a in which the sheathed heating elements 26 and 27 are embedded one above the other. Projecting from the ends of the sheathed heating element 27 are terminals 27a and 27b while projecting from the sheathed heating element 26 are terminals 26a and 26b. Preferably the ends of the sheaths of the heating elements 26 and 27 adjacent the terminals 26a, 26b and 27a and 27b are sealed with a suitable sealing compound generally designated at 28 in FIGS. 6, 11 and 14 of the drawings. This sealing compound completely encloses the ends of both sheaths and permits only a portion of the terminals 26a and 26b and 27a and 27b to project therefrom.

In a device built in accordance with the present invention, the lower element 26 was an element dissipating six hundred fifty watts of electrical energy at one hundred twenty volts. The upper element 27 was designed so that when the two heating elements 26 and 27 were connected in series they would dissipate the same wattage, namely six hundred fifty watts but at two hundred thirty volts.

In order to produce steam on the flash principle and to supply it beneath the sole plate 21 of the pressing iron 20, there is provided a steam generating chamber 30 (FIGS. 1, 6, 7 and 14) which is in good heat transfer relationship with the heating elements 26 and 27 and is defined within the space bounded by the inside edge of the U-shaped rib 21a at the bight portion of the heating elements and a vertical wall portion or cross member 21b integrally formed with the sole plate, this vertical wall having a rather odd-shaped configuration (FIG. 6) so as to define a recess designated at 31, to the rear of the vertical wall 21b, whereas the steam generating chamber 30 is forwardly of this wall.

In order to accommodate a closure or cover for the top of the steam generating chamber 30, the sole plate is provided with a U-shaped rib 21c of the same height as the vertical wall 21b which extends just inside the rib 21a. Also near the front of the steam generating chamber 30 there is a small raised U-shaped rib or wall portion 21d and raised wall portions 21a and 21f which may be considered extensions of the legs of U-shaped wall portion 21d but separated from the ends of these legs by narrow passageways 32 and 33 (FIGS. 6 and 7). The wall portions 21e and 21f are joined with the wall portion or cross member 21b. The raised integral wall portions 21b, 21c, 21d, 21e and 21f are all the same height to provide a level surface for engaging the underside of suitable steam generating chamber cover 34 which preferably is of the laminated construction disclosed and claimed in Jepson Patent 2,871,587, granted February 3, 1959, and assigned to the same assignee as the present application. As illustrated in FIG. 6 of the drawings, the wall portion 21e which merges with the rear wall portion 21b includes a lateral projection 21g while the raised potrion 21f includes a pair of lateral projections 21h and 21k which extend toward the projection 21g to define a labyrinth steam passageway.

As best shown in FIG. 6 of the drawings, water is supplied through a conduit 35 which extends through a suitable opening in cover 34 of the steam generating chamber and is deposited in a recess 36 at the rear end of the steam generating chamber and adjacent one leg of each of the U-shaped heating elements 26 and 27. So that only steam can escape from the recess 36, a raised wall 21m (FIGS. 6 and 14), somewhat lower than the adjacent wall portions 21b and 21f, for example, provides a passageway connecting the recess 36 with the remainder of the steam generating chamber 30. When the water is converted to steam it may pass over wall 21m and can then move forwardly through the steam generating chamber and through a labyrinth passageway defined by the lateral projecting ribs 21g, 21h and 21k whereby the steam may pass through the lateral passageways 32 and 33 into a U-shaped recess 37 (FIGS. 6 and 7) disposed along the entire inside wall of the raised U-shaped wall portion 21c. The U-shaped recess or chamber 37 is provided with a plurality of ports 38 (FIGS. 6 and 7) which lead to the underside of the sole plate and preferably empty into suitable grooves such as 39 defined on the underside of the sole plate to spread the steam over a substantial area of the sole plate 21. These grooves may be similar to those disclosed in Jepson Patent No. 2,871,587 referred to above. It will be apparent that steam entering the U-shaped recess 37 through the passageways 32 and 33 may go both forwardly and rearwardly, thus dispensing the steam to the sole plate through a plurality of spaced ports 38.

For the purpose of securing the multilayer somewhat triangular shaped cover 34 of the steam generating chamber 30 to the sole plate 21, there are provided a plurality of fastening means 40 and 41, the fastening means 40 going substantially through the center of the cover 34 and the fastening means 41 securing the front and the rear corners of the cover. For reasons which will become apparent from the ensuing description, the cover 34 is provided with integral rearwardly extending clamping projections 34a and 34b (FIGS. 6, 7, 11 and 14). It is also provided with a fairly large opening 43 which affords access to the recess 31 described above. Additionally, the cover 34 is provided with a central extension 34c beyond the rear wall 21b of the steam generating chamber 30 for supporting a tubular or sleevelike temperature adjusting screw 44, best shown in FIGS. 6, 7 and 8 of the drawings. Preferably the extension 34c of cover 34 is provided with a tapped opening to accommodate the temperature adjusting screw 44 which is the sleevelike member having threadedly mounted therein a calibrating screw 45 which may be adjusted for calibrating the temperature responsive means described hereinafter.

In order selectively to control the temperature at which the sole plate 21 is operated, there is provided a temperature responsive switch means generally designated at 46 which includes a bimetallic element 47 disposed within the recess 31 as best shown in FIGS. 6 and 7 of the drawings. In accordance with the present invention, one end of the bimetallic element 47 is secured in intimate contact with the sole plate 21, and as illustrated bimetallic element 47 is provided with an opening to receive therein a cylindrical projection 21n (FIG. 7) integrally formed with the sole plate 21. To clamp the element 47 against the bottom of recess 31a in good heat exchange relationship therewith there is provided a suitable cup-shaped member 48 which encloses the cylindrical projection 21n. A fastening means 49 holds the cup-shaped member 48 against the bimetallic element 47 to clamp the latter against the bottom of the recess 31. Preferably the recess 31 has a small raised area for engagement with the clamped end of the bimetallic element so that the remainder of the bimetallic element 47 is raised above the bottom of the recess 31 as clearly shown in FIG. 7 of the drawings.

Preferably and as illustrated in the drawings, the bimetallic element 47 has the high expansion side thereof disposed downwardly so that the free end thereof deflects upwardly with heating. Moreover, in accordance with the present invention, the bimetallic element 47 is a unitary self-compensating structure in that a portion of the free end thereof is bent or folded back upon itself as indicated at 47a. The purpose of this folded over portion is to provide an integral compensating portion. It will be appreciated that the lower portion of the bimetallic element or in other words the major portion thereof is primarily responsive to sole plate temperature while the upper doubled back portion 47a is spaced far enough from the sole plate so that it responds primarily to the ambient temperature in the area immediately surrounding the same within the recess 31. As the lower portion of the bimetallic element 47 heats up, the free end deflects upwardly in response to both radiation and conduction from the sole plate, as well as the ambient temperature rise. At the upper leg 47a defined by the folded back portion thereof is heated by the increase in ambient temperature, the free end of this folded back portion 47a deflects downwardly. By suitable selection of the length of the main portion of the bimetallic element 47 and the folded over portion 47a as well as the width thereof, the downward deflection of the folded back portion 47a may be made substantially equal to the upward deflection of the principal portion of the bimetallic element 47 due to ambient temperature rise. Thus, there is provided a one-piece bimetallic element which is compensated so that it responds solely to sole plate temperature.

For the purpose of causing the deflection of the bimetallic element 47 to be transmitted to the switch portion of the thermoresponsive switch means and also to provide means for selectively controlling the temperature at which the bimetallic element 47 is effective to perform a control function, there is provided a flat link member 51 having a force transmitting insulating member 50 (FIGS. 5, 6, 7 and 10) at one end. This link member 51 has an intermediate portion thereof riveted or otherwise secured as indicated at 52 to a leaf spring 53 the other end of which leaf spring is suitably secured as by staking to a short vertical projection from the free end of the folded back portion 47a of the bimetallic element 47. The portion of the link 51 remote from force transmitting member 50 is designated as 51a and it rests on the staked connection to the bimetallic element. Moreover, it extends rearwardly directly below the calibrating screw 45 (FIGS. 7 and 8) whereby the position of link 51 may be selectively controlled independently of the position of the bimetallic element 47 which supports the link through leaf spring 53. With this arrangement a friction free pivotal connection is provided between the free end of bimetallic element 47 and link 51, the spring 53 being a sort of connector holding the parts in assembled relationship.

For the purpose of manually adjusting the position of extension 51a and, hence, selectively controlling the temperature at which the sole plate 21 is operated, there is provided a temperature adjusting arm 55 having one end thereof secured as by a nut 56 to the temperature adjusting screw 44. The other end of the temperature adjusting arm 55 is provided with a suitable manually actuatable control knob 57. By moving the control knob through an arch of a circle about the axis of the adjusting screw 44, the extension 51a of the link 51 is moved and, of course, the proper calibration may be obtained by adjusting the calibrating screw 45 relative to the temperature adjusting screw 44. To insure accurate adjustment of the adjusting screw 44 which has fairly coarse threads for all positions thereof, there is provided a leaf spring member 58 (FIGS. 6, 7, 8 and 11) which has one end interposed between a peripheral flange 44a on temperature adjusting screw 44 and the cover 34 of the generating chamber 30, while the other end is clamped to the top of the cover 34 by means of one of the screws 41 holding the cover 34 to the sole plate. This leaf spring 58 will eliminate any play and will always maintain the adjusting screw 44 in its uppermost position for any particular setting, thus eliminating any error due to lost motion or play.

Figure 5:
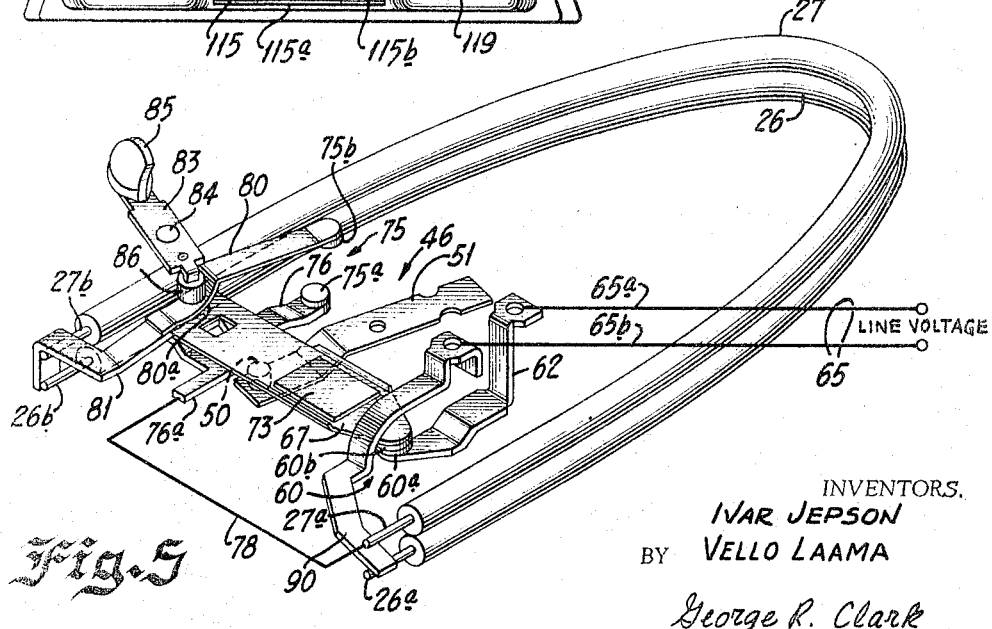
FIG. 5 is a schematic perspective view illustrating the electrical circuit of the pressing iron of the present invention.
Figure 6:
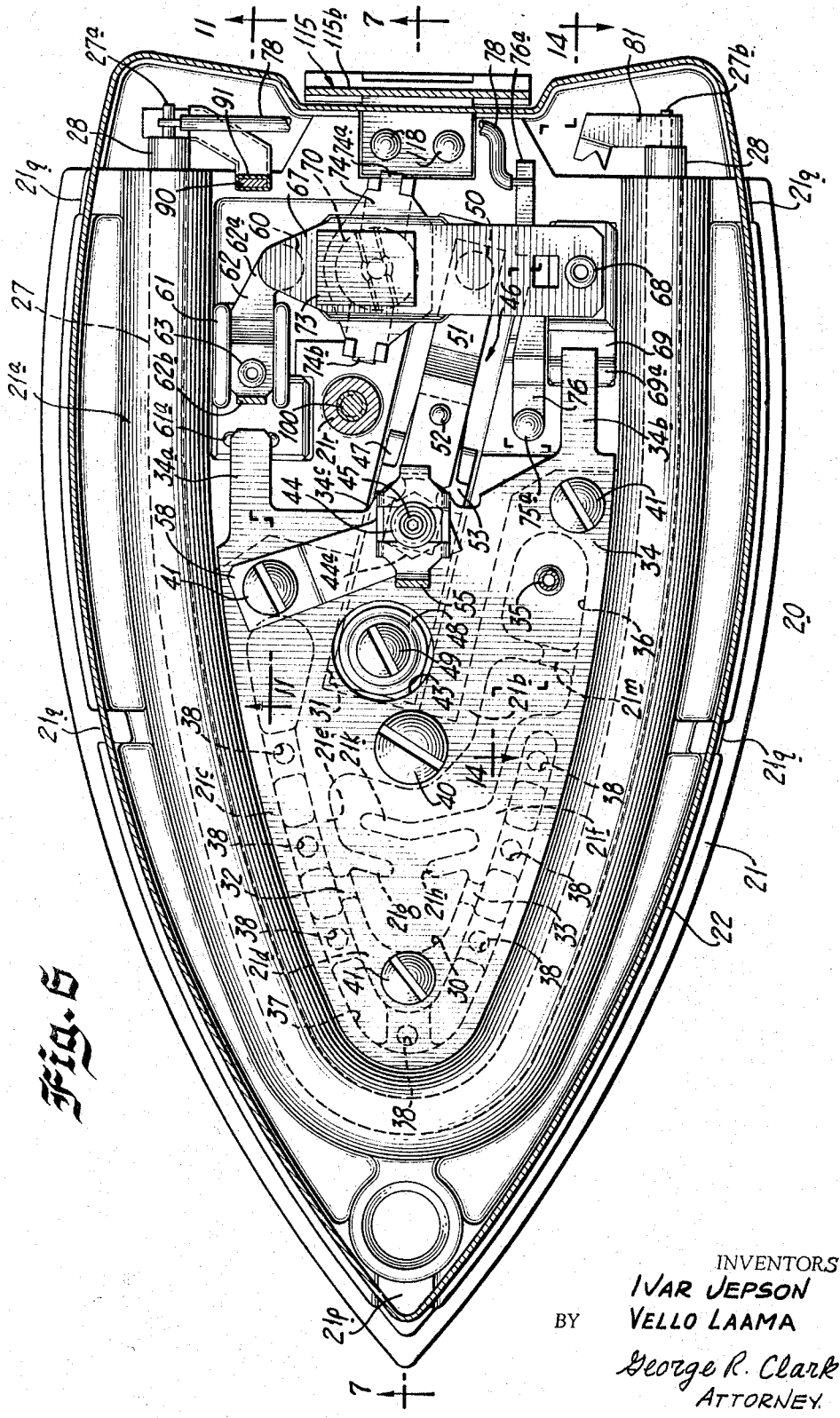
FIG. 6 is an enlarged sectional view taken on line 6—6 of FIG. 1 assuming that FIG. 1 shows the complete structure.

So that the bimetallic element 47 may upon deflection thereof perform a temperature control function, there is included in the temperature responsive switch means 46 a main switch 60 comprising relatively movable contacts, specifically designated as a stationary contact 60a and a movable contact 60b, best shown in FIG. 5 of the drawings, but also visible in FIG. 10. To support the stationary contact 60a in an insulated manner in the space between the ends of the U-shaped rib 21a, as best shown in FIGS. 6 and 11 of the drawings, there is provided a ceramic lead bracket insulator 61 to which is riveted or otherwise secured as indicated at 63 to a rigid bus bar-like conducting member 62 of L-shape. The lead bracket insulator 61 is recessed on the underside so that rivet 63 will not electrically engage the sole plate 21 or any other conducting portion. The stationary contact 60a of switch 60 is secured to one arm 62a of rigid lead or bus bar 62. The other arm 62b of the lead 62 extends upwardly and terminates in a tapped opening for accommodating a screw 64 by means of which there may be secured thereto one lead 65a of a twin conductor power cord 65 having a second lead 65b.

To secure the lead bracket insulator 61 in position it is provided with an upwardly directed projection 61a engageable by the clamping extension 34a of the steam generating cover 34 so that when the cover is secured in place by screws 40 and 41 the insulator 61 and consequently the lead 62 and associated stationary contact 60a are all securely held in place within the recess 31 in sole plate 21. Preferably the recess 31 of sole plate 21 is provided with a depression conforming to part of the lead bracket insulator 61 so that it cannot move out of position when clamped by the extension 34a of the cover plate 34.

For the purpose of moveably supporting the movable contact 60b of the switch 60 there is provided a resilient switch arm 67 which has one end thereof riveted as indicated at 68 to a suitable switch blade insulator 69 preferably also formed of a ceramic insulating material which is disposed in the recess 31 in the sole plate 21 on opposite side thereof from the insulator 61, as best shown in FIGS. 6, 10 and 14 of the drawings. The switch blade insulator 69 is also disposed in a suitable recess defined in the sole plate so that it cannot move out of place and includes an upwardly extending projection 69a engaged by the extension 34b of the cover plate 34. Secured to the free end of the resilient switch arm 67 is the movable contact 60b of the switch 60. Moreover, as is best shown in FIGS. 5 and 6 of the drawings, the resilient switch arm 67 extends over the insulating force transmitting member 50 associated with the link 51 whereby movement of member 50 may readily cause relative movement of the contacts of switch 60 to selectively control the temperature of the heating element.

In order that the control switch 60 is capable of operating on direct current as well as on alternating current and on voltages which may be as high as two hundred thirty volts, means are provided to insure that the contacts of switch 60 open and close with a snap action. To this end there is suitably mounted within a recess in the sole plate 21 a permanent magnet 70 (FIGS. 6 and 10) disposed between the force transmitting member 50 and the switch 60 directly beneath the movable or resilient switch arm 67. So that the switch arm 67 which may be constructed from non-magnetic material is magnetically attracted by magnet 70, an armature 73 is preferably secured to the switch arm 67 adjacent magnet 70. In order electrically to insulate the switch arm 67 from the magnet 70, there is provided a magnet insulator 74 which is preferably formed of a thin sheet of mica deformed into an L shape, one portion of which is suitably interposed between the magnet 72 and the switch arm 67. As best shown in FIG. 6 of the drawings, the insulator 74 is provided with laterally projecting ears 74a and 74b which are receivable within suitable recesses defined in integral projections of the sole plate 21 disposed in recess 31.

So that the electric heating elements 26 and 27 may be operated from electric power sources of different voltages, there is provided a voltage selector switch generally designated as 75 (shown in the open or high voltage position in FIGS. 5 and 14) comprising a stationary contact 75a and a movable contact 75b. The stationary contact 75a is preferably supported on a suitable bus bar 76 secured to the switch insulator 69 by the rivet 68. This bus bar 76 has a forward extension supporting the contact 75a and a rearward extension 76a to which an electrical connection as by an insulated lead 78 is connected to the terminal 27a with the heating element 27. The movable contact 75b of the voltage switch 75 is mounted on the free end of a resilient switch blade 80 which includes adjacent the other end an arcuate portion 80a. This arcuate end of the switch blade 80 is suitably secured as by welding or the like to a rigid lead 81 which is supported and electrically connected to both the terminals 26b and 27b of the heating elements 26 and 27, respectively, as best shown in FIGS. 5, 10 and 14 of the drawings.

For the purpose of manually actuating the voltage switch 75, there is provided a voltage switch lever 83 (FIGS. 5, 10, 14 and 16) pivotally mounted as indicated at 84 to the top side of cover shell 22. One end of the voltage lever 83 is provided with a control knob 85 while the other end is provided with a depending insulating projection 86 extending below the cover shell 22 through a suitable opening 87 defined therein. The projection 86 is adapted to engage the top of the resilient switch blade 80 adjacent the arcuate portion 80a. In one position of the lever 83 (high voltage position) shown in FIG. 5 of the drawings, the switch 75 is open, while in the other position of the projection 86 of voltage switch lever 83 rides up the incline of the arcuate portion 80a and forces, against the inherent resilience of switch blade 80, the movable contact 75b into engagement with the contact 75a.

To complete the electrical circuit for the heating elements 26 and 27 of the pressing iron 20, there is provided a rigid element lead 90 (FIGS. 5, 6, 7, 10 and 11) having one end thereof welded or otherwise supported from the terminal 26a of the heating element 26. This element lead 90 is preferably insulated as indicated at 91. The end of the element lead 90 is preferably disposed adjacent the end of the arm 62b of the rigid lead 62 and is electrically connected to the twin conductor lead 65b of the power cord 65, as by screw 92 (FIG. 11).

It will be apparent from FIG. 5 of the drawings that when the voltage switch 75 is in the open or high voltage position there illustrated, and power is supplied to the power cord 65, current will flow from the power source through conductor lead 65a, lead bracket 62, main control switch 60, resilient switch arm 67, bus bar 76, lead 78, terminal 27a of heating element 27, heating element 27, terminal 27b of heating element 27, conductor 81, terminal 26b of heating element 26, heating element 26, terminal 26a of heating element 26, lead 90 and thence through twin conductor 65b of power cord 65 back to the power source. As was mentioned above, with this arrangement the two heating elements 26 and 27 are connected in series and in a device built in accordance with the present invention the electrical energy dissipated was six hundred fifty watts at two hundred thirty volts of line voltage. When it is desired to operate the pressing iron 20 from a one hundred twenty volt source of electrical energy, the voltage lever 83 is manipulated to close the voltage switch 75 in which case the circuit may be traced as follows: from twin conductor lead 65a, lead bracket 62, main control switch 60, resilient switch arm 67, voltage switch 75, resilient switch blade 80, conductor 81, terminal 27b of heating element 27, heating element 27, terminal 27a of heating element 27 and conductor 90 to the other twin conductor lead 65b. In the latter case only the lower heating element is employed and it preferably is designed to dissipate six hundred fifty watts of electrical energy at one hundred twenty volts.

It will be understood that the cover shell 22 encloses the upper surface of the sole plate so as to hide from view the temperature responsive control means and the upper surface of the sole plate and cover for the steam generating chamber described above. So that a very compact iron is provided, this cover shell has a very shallow depth. To support the major portion of the cover shell 22 in spaced relationship with the hole plate 21 so that it does not become overly heated, the sole plate is provided with a slightly raised forward projection 21p and raised projections 21q along the sides of the sole plate, best shown in FIGS. 1, 2, 3 and 6 of the drawings. The rear portion of the cover shell 22 disposed beneath insulated handle support member 23 is slightly raised as indicated at 22a (FIGS. 10, 11, 14 and 16) and is provided with an elongated opening 94 through which the conductors 62b and 90, which are connected to the power cord 65, may extend. So that these conductors are insulated from the cover shell 22 and from each other, there is provided an insulator bushing 95 (FIGS. 10 and 11) provided with an annular flange 95a which rests on the portion of the cover shell 22 defining the opening 94. The insulator bushing 95 includes a central partition 95b which separates the conductors 90 and 62. Moreover, this partition 95b defines a ledge 96 for supporting the end of conductor 90.

In order that the conduit 35, supplying water or other liquid to the steam generating chamber 30, may extend above the cover shell 22, the latter is provided with another opening 98 (FIGS. 14 and 16) through which the conduit 35 may extend. So that the voltage switch blade 80 will be insulated from the cover shell 22 when in the open position shown in the drawings, an insulating sheet 99 is mounted on the underside of the cover shell 22 directly above the switch blade 80 as is best shown in FIG. 14 of the drawings. This sheet may be riveted or otherwise secured to the cover shell 22.

To secure the cover shell 22 to the sole plate 21 the latter is provided with an integral upstanding tubular member post 21r (FIGS. 6 and 9) provided with a tapped opening to receive a suitable fastening means 100 which clamps the cover shell to the sole plate so that the cover shell rests on the integral projections 21p and 21q. The cover shell is, of course, provided with a suitable opening 101 affording access to the temperature adjusting screw 44 and so that connection therewith can be made to the temperature adjusting arm 55. This opening also, of course, provides access to the adjustable member 45 through the hollow temperature adjusting screw 44 and a suitable tool, such as an Allen wrench or the like, may be employed to make this adjustment.

Figure 4:
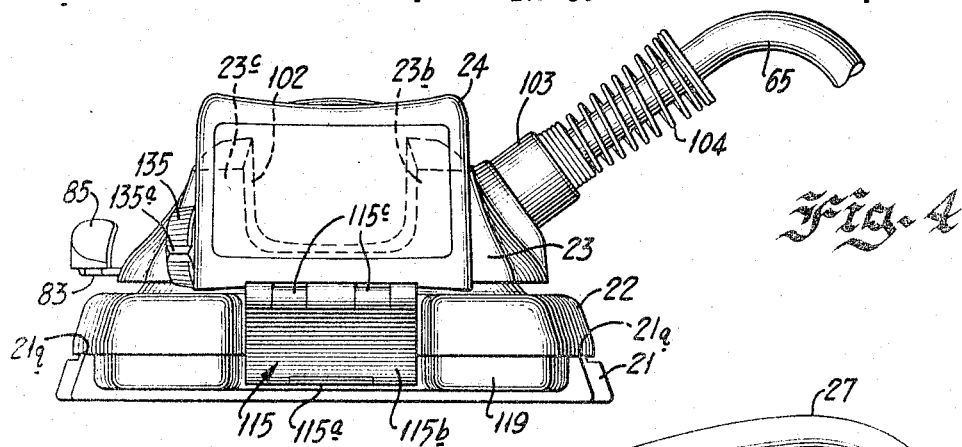
FIG. 4 is a rear end view of FIG. 2 taken in the direction of the arrows 4—4 of FIG. 2.

In order to provide a stationary insulating member for supporting the fixed end of the power cord 65 and to fixedly support the end of the conduit 35, there is provided the stationary insulated handle support 23 referred to above which is preferably formed of an insulating material, such as phenolic resin or the like, which is capable of withstanding the temperatures which are involved. The insulating handle support 23 includes an integral base portion 23a which is adapted to completely overlie the raised portion 22a of the cover shell 22. Moreover, it includes a pair of spaced upwardly extending hollow side post portions 23b and 23c, best shown in FIGS. 7, 10, 11 and 14 of the drawings which define a recess 102 therebetween. The upwardly extending post portion 23b is provided with a suitable opening through which the power cord 65 may extend. Preferably a suitable strain relief member is employed with the conventional bushing 103 and cord spring 104 (FIGS. 3 and 4).

In accordance with the present invention, and as best shown in FIGS. 10, 14 and 15 of the drawings, the upwardly extending post portion 23c is provided with an opening 105 through the top wall thereof for accommodating a resilient tubular water gasket 106. The end of the water conduit 35 extends into the water gasket 106. The water conduit 35 and specifically the portion thereof within the water gasket 106 is provided with a restriction designated as 35a (FIG. 15) for providing a desired flow control. In a device built in accordance with the present invention, this restriction was such as to provide a passageway eighteen thousandths of an inch in diameter. Also in accordance with the present invention, the upper end of the water gasket 106 is provided with a generally spherical configuration as designated at 106a so that ready and waterproof connection can be made with the water reservoir described hereinafter.

To secure the insulating handle support 23 to the cover shell 22, there is provided a suitable screw or fastening means 107 (FIGS. 3 and 9) which fastening means extends through an opening in the base portion 23a of the support 23 and engages a suitable nut 108 which is associated with the cover shell in a conventional manner. Preferably the support 23 is provided with a plurality of depending projections 23f receivable in suitable openings in cover shell 22. Moreover, so that access to the calibration screw 45 may readily be had, the base portion 23a of the support 23 is provided with an opening 109 (FIG. 7) aligned with the opening in the temperature adjusting screw 44. To accommodate the temperature adjusting arm 55 with its associated knob 57, the forward portion of the base 23a is provided with a suitable recess best shown in FIG. 1 of the drawings and designated as 110. Preferably, the upper surface of the forward portion of the base 23a is provided with an arcuate area designated at 111 on which suitable indicia are provided indicating the temperature settings for the type of material to be ironed. The support 23 is also recessed as designated at 112 in FIGS. 1 and 2 of the drawings to accommodate the voltage control lever 83 with its associated knob 85. Preferably suitable indicia such as "H" and "L" are provided on the support 23 adjacent the knob 85 indicating the voltage knob setting as either high or low, respectively.

For the purpose of providing interlocking means with the handle 24, the top of post portion 23b of stationary handle support 23 is provided with an upwardly directed projection 23d (FIGS. 3, 7 and 10) and similarly the top of post portion 23c is provided with a projection 23e (FIGS. 2 and 3). Also for the purpose of latching the handle 24 into operative position as described hereinafter, the post portions 23b and 23c at the forward edges thereof adjacent the recess 102 are provided with latching recesses 112 and 113, respectively.

In order to secure the handle 24 to the other portions of the pressing iron 20 in a manner so that it may be latched into the operative position shown in FIG. 1 or into the folded position shown in FIGS. 2 and 3, there is provided a three leaf hinge generally designated at 115 comprising a bottom leaf 115a, an intermediate leaf 115b and an upper leaf 115c. The lower and intermediate leaves 115a and 115b are interconnected by hinge pin 116 while the upper leaf 115c and the intermediate leaf 115b are interconnected by hinge pin 117. As illustrated in the drawings, the lower leaf 115a is preferably secured to a projection 21s extending rearwardly from the heel of the sole plate as by means of rivets 118. Moreover a suitable bottom closure plate 119 is preferably secured to the underside of the sole plate by the same rivets 118. The rear of the cover shell 22 and the rear of the bottom rear closure plate 119 are provided with a central depression as best shown in FIG. 4 of the drawings to accommodate the hinge 115. Moreover, the rear of the cover shell and the rear of the closure plate and specifically the outside edges thereof project beyond the hinge so as to provide a two point support as part of the heel rest. The rear of the handle 24 designated as 24a is appropriately designed to provide an additional support so that the iron may readily be supported on the heel in the conventional manner.

As is best shown in FIG. 7 of the drawings, the handle 24 is hollow to define a reservoir 120 therein. Preferably the upper end of the handle is provided with a suitable filling opening designated as 121, which may be closed by a suitable closure plug 122. As illustrated, the closure plug is provided with a forwardly extending lip portion 122a to provide a finger engaging extension for readily removing the same. In a preferred embodiment, the closure 122 is provided with a peripheral flange disposed in a recess surrounding the opening 122 so that the closure plug does not project above the handle and interfere with the manipulation thereof by the user. So that the closure plug remains associated with the pressing iron 20, it is preferably secured to the closure member with a flexible chain or the like designated as 123 and a retainer 124. The handle 24 is preferably molded from a suitable phenolic resin and so that this may be readily accomplished the rear thereof is open and may be closed by a suitable closure plate 126 as best shown in FIG. 7 of the drawings. This closure plate may be cemented or otherwise secured to the handle 24. Preferably an L-shaped baffle plate 125 is provided within the water reservoir 120 which is suitably riveted to the reservoir walls by rivets 127 which secure the upper hinge leaf 115c to the handle. So that water leakage does not occur, a suitable gasket 128 is interposed beneath the L-shaped baffle and bottom wall of the reservoir 120.

The underside of the handle immediately above the support 23 is provided with a flat surface to accommodate the hinge leaf 115c and, in fact, is recessed so that the leaf 115c is flush with the bottom of the handle. Moreover, to accommodate the projections 23d and 23e described above and the spherical projection 106a of gasket 106, suitable recesses 129, 130 and 131, respectively, are provided on the underside of the handle 24 (FIG. 13). Preferably the recess 131 is shaped to conform to the cylindrical surface 106a of the water gasket 106 so that when the handle is latched in the operative position, a seal is made between the gasket 106 and the walls defining the recess 131. Moreover, an opening 132 (FIGS. 10 and 13) is provided in the bottom wall of the reservoir 120 leading to the recess 131 so that water contained within the reservoir 120 may flow to the conduit 35, the flow being controlled by the restriction 35a described above.

It will be appreciated from the above description that by virtue of the recess 102 provided between the upwardly directed projections 23b and 23c, and the three leaf hinge 115 that the handle 24 may be pivoted rearwardly and folded or depressed so as to be disposed between the projections 23b and 23c as clearly shown in FIGS. 2, 3 and 4 of the drawings. Obviously some means must be provided to prevent the water from escaping from the reservoir 120 through the opening 132 and to this end there is provided a water control valve 134 mounted in the side wall of the handle 24. Preferably, and as best shown in FIGS. 1 and 2 of the drawings, a knob 135 is provided with a pointer 135a which indicates the "On" and "Off" position by virtue of suitable indicia provided on the associated surface of the handle 24. As illustrated, the valve 134 is provided with an opening 136 leading to a circumferential groove 137 which controls the water flow from the reservoir 120 to the passageway 132 and, consequently, to the conduit 35.

To latch the handle 24 in the operative position there is provided a latch member 140, best shown in FIGS. 7, 12, 13 and 17 of the drawings, which includes trunnion portions 140a and 140b pivotally supported between upper projecting fingers 141 and lower fingers 142 on upper leaf 115c of the hinge 115. The latching member 140 is provided with latching projections 140c and 140d which are receivable in the latching recesses 112 and 113, respectively. When the handle 24 is latched in the operative position shown in FIG. 1 of the drawings, it is effectively rigidly connected to the support 23 and, hence, to the rest of the iron 20 and at the same time a seal is completed between the water gasket 106 and the recess 131 in the handle 24.

In view of the detailed description included above, the operation of the pressing iron of the present invention will readily be understood. The iron may be operated as a steam iron and as a pressing iron and the desired temperature control is provided as well as voltage control so that the iron may be used as a travel iron and can be used throughout the world. A suitable adapter for the power cord will be provided to accommodate the various wall receptacles in different parts of the world. Moreover the iron is very compact to begin with and may be folded as indicated in FIGS. 2, 3 and 4 of the drawings to take a minimum space in the luggage of the user.

While there has been shown and described a single embodiment of the present invention, it will be apparent to those skilled in the art that various changes and modifications may be made without departing from the invention in its broader aspects and it is, therefore, contemplated in the appended claims to cover all such changes and modifications as fall within the true spirit and scope of the invention.

What is claimed as new and desired to be secured by Letters Patent of the United States is:

1. An electrically heated flatiron selectively operable from either a low or a high voltage power source comprising the combination of a sole plate, a first electric heating element mounted in heat exchange relationship with said sole plate, a second electric heating element mounted in heat exchange relationship with said sole plate and disposed adjacent said first element, a pair of terminals mounted on said sole plate, switch means for connecting said first heating element across said terminals when said flatiron is operated from a power source having a voltage of one magnitude and for connecting both said first and second heating elements to said terminals when said flatiron is operated from a power source having a voltage of a different magnitude.

2. The flatiron of claim 1 wherein said switch means includes a multiposition manually actuatable pivoted control member.

3. In combination with a flatiron selectively operable from either a low or a high voltage power source, a sole plate, a first generally U-shaped electric heating element mounted in said sole plate, a second generally U-shaped electric heating element mounted in said sole plate, said heating elements being disposed one above the other, terminals mounted on said flatiron for connecting said flatiron to an electric power source, and means including manually operated switch means for connecting said first heating element to said terminals when said flatiron is connected to a low voltage power source and for connecting both said first and second heating elements to said terminals when said flatiron is connected to a high voltage power source.

4. A flatiron for operation from a low and a high voltage power source comprising a sole plate, a first resistive heating element carried in said sole plate, a second resistive heating element carried in said sole plate, means including power terminals in said flatiron for connecting said flatiron to said power sources and means including switch means for connecting said first heating element to said power terminals when said flatiron is operated from one of said power sources and for interconnecting both of said heating elements to said power terminals when said flatiron is operated from the other of said power sources, the ratio of resistive values of said heating elements being proportioned in relation to the ratio of voltages of said low and high voltage power sources so that the heat produced by said first heating element when said flatiron is connected to said one of said power sources is substantially equal to the heat produced by both heating elements when said flatiron is connected to the other of said power sources.

5. An electric flatiron for operation from a low and a high voltage power source comprising a sole plate, a first electric heating element in said sole plate, a second electric heating element in said sole plate adjacent said first heating element, means including electric terminals on said flatiron, means including switch means for connecting said first heating element to said terminals when said flatiron is operated from one of said power sources and for connecting said heating elements in series across said terminals when said flatiron is operated from the other of said power sources, and means responsive to the temperature of said sole plate for alternately connecting and disconnecting at least one of said heating elements with said terminals to maintain the temperature of said sole plate substantially constant.

6. A travel electric steam iron operable from either a low or a high voltage power source comprising a sole plate, a handle secured to said sole plate, a steam generating chamber in said sole plate, a water reservoir in said handle for supplying water to said steam generating chamber, a first electric heating element in said sole plate, a second electric heating element in said sole plate, means including terminals supported on said sole plate for connection to either of said power sources, means including switch means for connecting said first heating element to said terminals when said steam iron is operated from one of said power sources and for connecting both of said heating elements to said terminals when said steam iron is connected to the other of said power sources, and means responsive to the temperature of said sole plate for alternately connecting and disconnnecting at least one of said heating elements with said terminals to maintain the temperature of said sole plate substantially constant.

7. In an electric iron, a sole plate, an electric heating element carried in said sole plate, terminal means for connecting said heating element to an electrical power source, means including switch means for interconnecting said heating element to said terminal means, said switch means including a pair of relatively movable contacts alternately to connect and disconnect said heating element to said terminal means, and temperature responsive means responsive to the temperature of said sole plate for producing relative movement of said contacts, said temperature responsive means including a U-shaped bimetallic element having a long leg and a short leg, said long leg having its end remote from the bight of the U secured to said sole plate to produce movement of the bight end of said element in one direction as the temperature of said sole plate increases, said short leg having its end remote from the bight of the U operatively connected to produce relative movement of said movable contacts, said end of said short leg being movable in a direction opposite said one direction as the ambient temperature around said bimetallic element increases.

8. A travel iron comprising a sole plate, a handle support member extending upwardly from said sole plate and provided with a pair of spaced apart upwardly extending side portions defining a handle accommodating recess therebetween, said side portions being fixedly positioned relative to said sole plate, a handle movable between a first operating position wherein the lower surface of one end thereof is positioned to engage the top of said side portions of said support member and a second travel position wherein said handle is disposed between said side portions within said recess, and hinge means for pivotally securing one end of said handle to said sole plate.

9. In a flatiron the combination of a sole plate, a handle support member extending upwardly from said sole plate and provided with a pair of spaced apart upwardly extending side portions defining a handle accommodating recess therebetween, said side portions being fixedly positioned relative to said sole plate, a handle movable between a first operating position wherein the lower surface of one end thereof is positioned to engage the top of said side portions of said support member and a second travel position wherein said handle is disposed between said side portions within said recess, hinge means for pivotally securing one end of said handle to said sole plate including a first member secured to said sole plate, a second member pivoted to said first member, and a third member secured to said one end of said handle and pivoted to said second member.

10. A travel iron comprising a sole plate, a handle support member extending upwardly from said sole plate and provided with a pair of spaced apart upwardly extending side portions defining a handle accommodating recess therebetween, said side portions being fixedly positioned relative to said sole plate, a handle movable between a first operating position wherein the lower surface of the rearward end thereof is positioned to engage the top of said side portions of said support member and a second travel position wherein said handle is disposed between said side portions within said recess, hinge means for pivotally securing one end of said handle to said sole plate including a first member secured to the rear of said sole plate, a second member pivoted to said first member, and a third member secured to the rear of said handle and pivoted to said second member, and latch means for latching said handle in its first position.

11. A travel steam iron comprising a sole plate, a steam generating chamber in said sole plate, a handle support member extending upwardly from said sole plate and provided with a pair of spaced apart upwardly extending side portions defining a handle accommodating recess therebetween, said side portions being fixedly positioned relative to said sole plate, a handle movable between a first operating position wherein the lower surface of the rearward end thereof is positioned to engage the top of said side portions of said support member and a second travel position wherein said handle is disposed between said side portions within said recess, a water reservoir in said handle, a water conduit having one end terminating at the top of one of said side portions and the other end connected to said steam generating chamber, and cooperating means on said handle and said top of one of said side portions for completing a connection between said one end of said conduit and said reservoir when said handle is in said first position and for interrupting said connection when said handle is in said second position.

12. The steam iron of claim 11 wherein said cooperating means comprises a recess in said handle and a projection of said conduit above said top of one of said side portions receivable in said recess.

13. The steam iron of claim 12 wherein each of said side portions is provided with a projection from the top thereof and said handle is provided with recesses to receive said projections, whereby said handle is properly orientated when in said first position.

14. In a travel iron of the type capable of producing steam at the ironing surface thereof, the combination of a sole plate, a steam generating chamber in said sole plate, electric heating means for said sole plate, a handle support member extending upwardly from said sole plate and provided with a pair of spaced apart upwardly extending side portions defining a handle accommodating recess therebetween, a handle movable between a first operating position wherein the lower surface of one end thereof is positioned to engage the top of said side portions of said support member and a second travel position wherein said handle is disposed between said side portions within said recess, a water reservoir in said handle, a water conduit partially disposed in said support member having one end terminating at the top of one of said side portions and the other end connected to said steam generating chamber, means on said handle for completing a connection between said one end of said conduit and said reservoir when said handle is in said first position, and hinge means for pivotally securing one end of said handle to said sole plate.

15. A travel steam iron comprising a sole plate, a steam generating chamber in said sole plate, a handle support member extending upwardly from said sole plate and provided with a pair of spaced apart upwardly extending side portions defining a handle accommodating recess therebetween, a handle movable between a first operating position wherein the lower surface of one end thereof is positioned to engage the top of said side portions of said support member and a second travel position wherein said handle is disposed between said side portions within said recess, a water reservoir in said handle, a water conduit having one end terminating at the top of one of said side portions and the other end connected to said steam generating chamber, means on said handle for completing a connection between said one end of said conduit and said reservoir when said handle is in said first position, hinge means for pivotally securing one end of said handle to said sole plate, and latch means for latching said handle in said first position.

16. A travel steam iron comprising a sole plate, a steam generating chamber in said sole plate, a handle support member extending upwardly from said sole plate and provided with a pair of spaced apart upwardly extending side portions defining a handle accommodating recess therebetween, a handle movable between a first operating position wherein the lower surface of one end thereof is positioned to engage the top of said side portions of said support member and a second travel position wherein said handle is disposed between said side portions within said recess, a water reservoir in said handle, a water conduit having one end terminating at the top of one of said side portions and the other end connected to said steam generating chamber, means on said handle for completing a connection between said one end of said conduit and said reservoir when said handle is in said first position, hinge means for pivotally securing one end of said handle to said sole plate, latch means for latching said handle in said first position, and sealing means for providing a watertight junction at said one end of said conduit when said latch means is effective.

17. The travel iron of claim 14 wherein valve means are provided between said water reservoir and said means on said handle.

18. The travel iron of claim 14 wherein a restriction is provided in said water conduit.

19. The travel iron of claim 14 wherein means are provided for preventing water flow from said reservoir when said handle is in said travel position.

20. A travel steam iron comprising a sole plate having a steam generating chamber therein, a handle support member secured to said sole plate and provided with a pair of upwardly extending spaced apart side portions defining a handle accommodating recess therebetween, a movable handle having a water reservoir therein pivotally secured to said sole plate and movable relative thereto between a first position wherein the lower surface of the rearward portion of said handle is positioned to lie adjacent the upper surface of said spaced apart side portions and a second position wherein said handle is disposed between said side portions in said recess, double acting hinge means for pivotally attaching said handle to said sole plate, latch means on said handle engageable with said support member for securing said handle in said first position, conduit means having one end connected to said steam generating chamber and the other end terminating on the upper surface of one of said side portions, and valve means in said handle having an inlet in communication with said reservoir and an outlet on the lower rear surface thereof adapted to communicate with the upper end of said conduit means when said handle is secured in said first position.

21. In a steam iron, the combination of a sole plate, electric heating means for said sole plate, a recess in said sole plate, a cover for said recess, means for securing said cover to said sole plate, said recess and cover defining a steam generating chamber in said sole plate, means for supplying water to said steam generating chamber through said cover, electrical conductor means for supplying electrical energy to said heating means, an insulating support means for said conductor means, and an extension on said cover engaging said insulating support means for holding said support means in fixed position when said cover is secured to said sole plate.

22. The steam iron of claim 21, wherein said sole plate is provided with an additional recess and said insulating support means comprises a plurality of insulating blocks removably disposed in spaced relationship in said additional recess, and wherein said cover is provided with a second extension, said extensions each engaging a different one of said blocks to hold said blocks within said spaced relationship.

23. In a steam iron, the combination of a sole plate, electric heating means for said sole plate, a first recess in said sole plate, a cover for said first recess, means for securing said cover to said sole plate, said first recess and cover defining a steam generating chamber in said sole plate, means for supplying water to said steam generating chamber through said cover, electrical conductor means for supplying electrical energy to said heating means, a second recess in said sole plate, an insulator block secured to said conductor means removably positioned in said second recess, and an integral extension of said cover engaging the top of said insulator block for holding said block in said second recess when said cover is secured to said sole plate.

24. An electrically heated flatiron comprising, the combination of a sole plate, an electric heating element mounted in heat exchange relationship with said sole plate, a pair of terminals mounted on said sole plate, switch means for connecting said heating element across said terminals comprising a resilient switch blade extending transversely across the rear of said sole plate, a switch contact supported on said blade, a permanent magnet supported on said sole plate beneath said switch blade, and means on said switch blade cooperating with said magnet to cause said contact to move with a snap action.

References Cited by the Examiner

UNITED STATES PATENTS

| | | | |
|---|---|---|---|
| 2,215,960 | 9/1940 | Gough | 38—90 |
| 2,339,744 | 1/1944 | Spencer | 38—90 X |
| 2,589,921 | 3/1952 | Boardman et al. | 38—77 |
| 2,750,695 | 6/1956 | Swenson | 38—77 |
| 2,763,075 | 9/1956 | Vance | 38—77 |
| 2,829,232 | 4/1958 | Negromanti | 38—82 |
| 2,853,815 | 9/1958 | Parr | 38—77 |
| 2,881,390 | 4/1959 | Schwaneke | 38—82 |

PATRICK LAWSON, *Primary Examiner.*